United States Patent
Buergi

(10) Patent No.: US 10,015,230 B1
(45) Date of Patent: Jul. 3, 2018

(54) COPYING AND PASTING AMONG NETWORKED DEVICES

(71) Applicant: Robert Buergi, Palo Alto, CA (US)

(72) Inventor: Robert Buergi, Palo Alto, CA (US)

(*) Notice: Subject to any disclaimer, the term of this patent is extended or adjusted under 35 U.S.C. 154(b) by 207 days.

(21) Appl. No.: 15/019,861

(22) Filed: Feb. 9, 2016

(51) Int. Cl.
| | |
|---|---|
| G06F 15/16 | (2006.01) |
| H04L 29/08 | (2006.01) |
| G06F 3/0482 | (2013.01) |
| G06F 3/0484 | (2013.01) |

(52) U.S. Cl.
CPC ............ *H04L 67/06* (2013.01); *G06F 3/0482* (2013.01); *G06F 3/0484* (2013.01); *H04L 67/10* (2013.01)

(58) Field of Classification Search
CPC ....... H04L 67/06; H04L 67/10; G06F 3/0482; G06F 3/0484
USPC .................................................. 709/203–248
See application file for complete search history.

(56) References Cited

U.S. PATENT DOCUMENTS

| | | | |
|---|---|---|---|
| 5,649,105 A | 7/1997 | Aldred | |
| 5,752,254 A | 5/1998 | Sakairi | |
| 5,923,845 A | 7/1999 | Kamiya | |
| 5,926,633 A | 7/1999 | Takagi | |
| 5,964,834 A | 10/1999 | Crutcher | |
| 6,195,091 B1 | 2/2001 | Harple | |
| 6,208,999 B1 | 3/2001 | Spilo | |
| 6,209,021 B1 | 3/2001 | Ahimovic | |
| 6,313,853 B1 | 11/2001 | Lamontagne | |
| 6,421,733 B1 | 7/2002 | Tso | |
| 7,124,372 B2 | 10/2006 | Brin | |
| 8,566,713 B2 * | 10/2013 | Toledano | G06F 3/0321 715/273 |
| 2001/0037367 A1 | 11/2001 | Iyer | |
| 2002/0075304 A1 | 6/2002 | Thompson | |
| 2002/0138653 A1 | 9/2002 | Ogura | |
| 2003/0037275 A1 | 2/2003 | Bakke | |
| 2004/0100496 A1 | 5/2004 | Creasor | |
| 2004/0153974 A1 | 8/2004 | Walker | |
| 2004/0210846 A1 | 10/2004 | Olsen | |
| 2006/0046239 A1 | 3/2006 | Allen | |
| 2006/0211404 A1 | 9/2006 | Cromp | |
| 2006/0259923 A1 | 11/2006 | Chiu | |
| 2007/0016771 A1 | 1/2007 | Allison | |
| 2007/0120871 A1 | 5/2007 | Okamoto | |
| 2007/0143382 A1 | 6/2007 | Luster | |
| 2008/0082932 A1 | 4/2008 | Beumer | |
| 2008/0256601 A1 | 10/2008 | Dutta | |

(Continued)

*Primary Examiner* — Moustafa M Meky
*Assistant Examiner* — Thorne E Waugh

(57) ABSTRACT

Systems and methods are disclosed for copying and pasting data between networked devices. Data copied on a source device and may be pasted on a destination device in response to the destination device receiving a paste command. The data from the source device may be automatically transmitted to, and available at, the destination device. The destination device may cycle through data copied from various devices based on the chronological order of when each piece of data was copied, or based on the devices' priority. The destination device may also present the user with a list of data copied at differences devices, from which the user may select which data to paste. A user may also use a special command, or may issue multiple paste commands within a predetermine period time, to indicate that the data to be pasted should be data from a different device.

20 Claims, 7 Drawing Sheets

(56) References Cited

U.S. PATENT DOCUMENTS

| | | |
|---|---|---|
| 2008/0282180 A1 | 11/2008 | Glasgow |
| 2008/0288301 A1 | 11/2008 | Emling |
| 2009/0000228 A1 | 1/2009 | Valoe |
| 2009/0063683 A1 | 3/2009 | Palin |
| 2009/0100503 A1 | 4/2009 | Doyle |
| 2009/0119246 A1 | 5/2009 | Kansal |
| 2009/0144368 A1 | 6/2009 | Andersen |
| 2010/0030505 A1 | 2/2010 | Kvavle |
| 2010/0058214 A1 | 3/2010 | Singh |
| 2011/0072365 A1 | 3/2011 | Pall |
| 2012/0246573 A1 | 9/2012 | Arokiaswamy |
| 2013/0304815 A1 | 11/2013 | Puente |
| 2014/0188802 A1* | 7/2014 | Branton ............... G06F 9/543 707/634 |
| 2015/0207850 A1* | 7/2015 | Jitkoff ............... H04L 67/06 715/748 |

* cited by examiner

COPYING AND PASTING AMONG NETWORKED DEVICES

TECHNICAL FIELD

This invention relates generally to human-computer interaction and communication systems. More particularly, this invention relates to methods and systems for copying and pasting data between different communicatively coupled devices, such as network-connected devices.

BACKGROUND

Computer users often use multiple and varied computing devices. A user may need to copy data between different devices in the course of performing a task. For example, a user may need to copy data residing on a laptop and paste it into a document residing on a personal computer. Transferring data between such devices is inefficient. It is therefore desirable to have systems and methods that allow for improved copying and pasting of data between different devices. It is further desirable to have systems and methods that allow for the intuitive and efficient control of such systems and methods.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented. But, it will be apparent to one of ordinary skill in the art that the subject matter may be practiced without these specific details. Moreover, the particular embodiments described are provided by way of example and should not be used to limit the scope of the invention to these particular embodiments. In other instances, well-known data structures, protocols, software operations, procedures, and components have not been described in detail so as not to unnecessarily obscure aspects of the embodiments of the invention.

As described below, the invention is necessarily rooted in computer technology in order to overcome a problem specifically arising in the realm of computer networks.

In the context of human-computer interaction, copying typically refers to creating a duplicate of selected data in memory, or creating a record identifying the selected data so that it may be duplicated later, if necessary. Such copied data and such record of selected data may be stored in a clipboard, short-term data storage, or other temporary data buffer used for transferring data between documents, applications, or folders of a single computing device. Such copied data typically can be accessed from applications running on a device via application programming interfaces (APIs). In this specification, references to copying data include both making a copy of the specified data in memory and issuing a copy command, such as the Control-C keystroke in most Microsoft Windows operating systems, even if the copy command does not result in making an additional copy of the specified data in memory. Pasting in the context of human-computer interaction typically refers to inserting copied data into a specified location of a document, application, interface, or file system on the same computing device from which the data was copied. The copying described herein may be performed by a copying module, and the pasting described herein may be performed by a pasting module. An input module may receive copy commands, paste commands, or both.

Example Devices and Network Configuration

Figure 1:
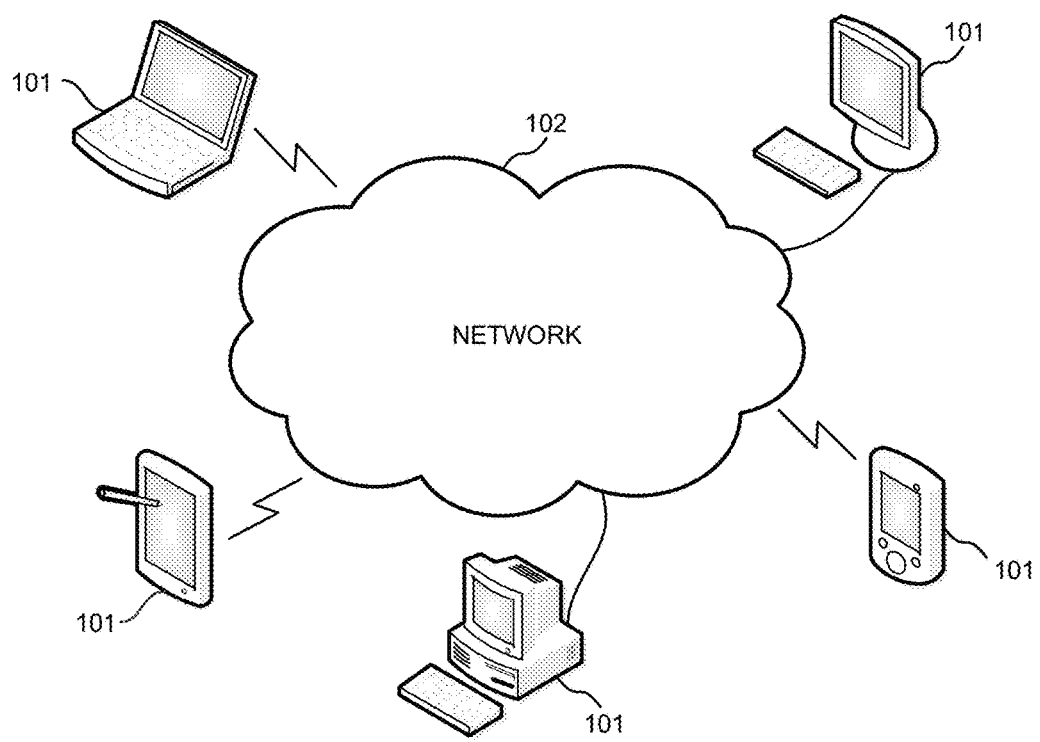
FIG. 1 is a block diagram illustrating different exemplary network-connected devices in accordance with one embodiment of the invention.

FIG. 1 is a block diagram illustrating different exemplary network-connected devices in accordance with one embodiment of the invention. Devices 101 may be any type of device from which a user may select data to be copied or paste data that has been copied. Such devices include without limitation personal computers, tablet computers, desktop computers, laptop computers, workstations, personal digital assistants, smart phones, smart watches, and wearable computers. Devices 101 may have a processor, memory, an output mechanism such as a monitor or screen, one or more input mechanisms such as a keyboard, mouse, or touchscreen, and components for network connectivity, such as a network interface card and/or antenna. Devices 101 may be connected to network 102, directly or indirectly. Devices 101 also may communicate with each other directly, without using intermediate network infrastructure such as a wireless router, by using, for example, the Wi-Fi network protocol.

Network 102 may be of any geographic scope sufficient to allow communication between devices 101, such as a wide area network, local area network, metropolitan area network, or campus network. Network 102 may also be of any type sufficient to allow communication between devices 101, such as an Ethernet, Wi-Fi, GSM, CDMA, or Bluetooth network. Network 102 may be wired or wireless, and may be public or private. Network 102 may include one or more sub-networks.

The embodiments described herein may take the form of hardware, software, firmware, or any combination thereof. Software embodiments may take any appropriate form, including an application, a service, a background process, a daemon, or a portion of an operating system. Such hardware and software may comprise different modules. Devices may have a storage module for purposes of storing data.

Example Device Discovery

In one embodiment, devices used in connection with the invention may automatically and transparently discovery each others' presence on the network and each others' ability to operate in accordance with the invention. Such device discovery and service discovery may use a decentralized discovery protocol. Such a protocol allows for device discovery on a network where no central store maintains information about network devices, their availability, and their supported services. In such method of discovery, each client may query the network and each device may respond to these queries. Such decentralized discovery does not require any central knowledge or configuration by a network administrator. Using such a protocol, information about available devices is always up to date because devices respond directly to queries and issue updates to other devices about their status.

In an exemplary embodiment, device discovery may use presence announcements and discovery queries. When a device joins a network, it announces its presence to the other devices on the network by using, for example, a broadcast or multicast network message. This presence announcement lets other devices on the network know that the device is available and may also inform the other devices of what services the announcing device supports. Such services may include a service that operates in accordance with the invention. From then on, the device does not need to send out any other presence announcements, except when it is leaving the network to inform the other devices on the network that it is leaving the network. Any devices that come online after the device has announced its presence may transmit discovery queries to the other devices on the network. A discovery query may ask what services a responding device supports, and may ask whether the target device supports a particular service of interest. A responding device may return a list of its supported services or may respond only if it supports the particular service of interest. A device does not need to repeat discovery queries because any device that later joins the network will announce its presence, and any device that later leaves the network will announce its departure. A device, however, may still repeat discovery queries, presence announcements, or both, for the sake of, for example, certainty or redundancy.

Device and service discovery may be accomplished using the Simple Service Discovery Protocol (SSDP), which is part of the Universal Plug and Play (UPnP) protocol stack and described in "UPnP™ Device Architecture 1.1," published by the UPnP Forum (2008), incorporated here by reference. Such device and service discovery may also be accomplished using zero-configuration networking, as described in "Zero Configuration Networking: The Definitive Guide," Stuart Cheshire and Daniel H. Steinberg, O'Reilly (2006), incorporated here by reference. Such device and service discovery may also be accomplished using Service Location Protocol (SLP), as described in "Service Location Protocol, Version 2," Guttman, E., RFC 2608, June 1999 and "Vendor Extensions for Service Location Protocol, Version 2," Guttman, E., RFC 3224, June 2002, incorporated here by reference. Those of skill in the art will recognize that such device and service discovery may also be accomplished using other methods known to those of skill in the art. Such device and service discovery may be performed by a discovery module that resides on one or more participating devices.

Figure 2:
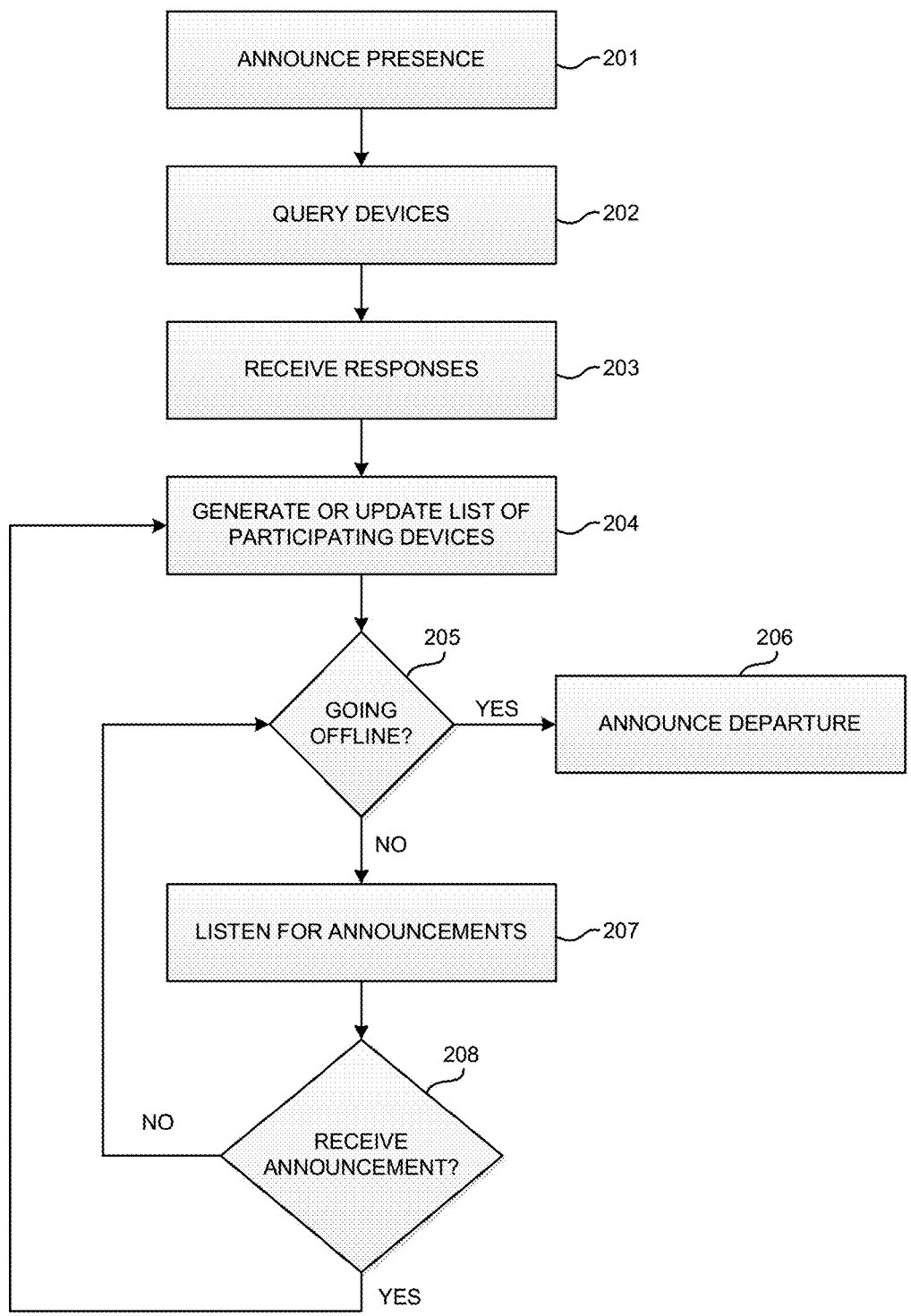
FIG. 2 is a flow diagram illustrating an exemplary method of discovering devices on a network in accordance with one embodiment of the invention.

FIG. 2 is a flow diagram illustrating an exemplary method of discovering devices on a network in accordance with one embodiment of the invention. At step 201, a device 101 announces its presence to one or more other devices on the network. Device 101 may do so when it connects to the network. At step 202, device 101 queries the network to discover the existence of other devices on the network that operate in accordance with the invention. At step 203, device 101 receives responses from one or more other devices on the network indicating that those devices operate in accordance with the invention. At step 204, device 101 generates a list of discovered devices that operate in accordance with the invention. If device 101 has previously generated such a list, it may update the list in step 204 to include newly discovered devices. In device 205, device 101 determines whether it is leaving the network. If device 205 is leaving the network, it announces to one or more other devices on the network that it is leaving the network. If device 101 is remaining on the network, it listens for announcements from other devices in step 207. If device 101 receives such announcements, it updates the previously generated list of discovered devices that operate in accordance with the invention. Device 101 may update the list by adding or removing devices in accordance with the announcement received in step 208.

Example User Interactions

The invention will be further described by way of the following non-limiting examples that illustrate how a user using the invention may more easily copy and paste information between devices.

In one embodiment, the first device may be a laptop computer and the second device may be a personal computer. The two devices may be connected via a Wi-Fi network. A user may access a source document on a first device, highlight data to be copied and issue a copy command, such as by pressing a Control-C keystroke on the first device's keyboard. The user may then access a document on the second device and issue a paste command, such as by pressing a Control-P keystroke on the second device's keyboard. Because the user has not yet issued a copy command on the second device, or any networked device other than the first device, the second device will paste into the document the data copied from the first device.

In another embodiment, the user may have previously issued a copy command on the second device, but issued that copy command on the second device more than some threshold time ago. The threshold time may be a configurable setting and may have a default value of, for example, one hour. In this case, the second device still will paste into the destination document the data copied from the first device, assuming that data was copied at the first device within the threshold time, e.g., less than one hour ago. A control module may be used to determine whether two commands occur within a predetermined amount of time.

In an alternative embodiment, the user may issue the same paste command repeatedly, each time within a predetermined amount of time since issuing the last paste command, to cycle through multiple pieces of copied data from multiple source devices. For example, a user may copy a phone number from a first device, then copy an email address from a second device, and then copy a social security number from a third device. The user may then issue three paste commands on the third device in rapid succession. Upon receiving the first paste command, the third device will paste the most recently copied data, which in this case is the social security number, into the destination document. Upon receiving the second paste command within the predetermined amount of time since the last paste command, the third device will replace the previously pasted data, in this case the social security number, with the next mostly recently copied data, in this case the email address. Upon receiving the third paste command within the predetermined amount of time since the last paste command, the third device will replace the previously pasted data, in this case the email address, with the next most recently copied data, in this case the phone number. The user may issue additional paste commands within the time threshold to continue cycling through the three pieces of copied data. If the user issues two paste commands that are separated by more than the predetermined amount of time, the second paste command will paste the most recently copied data, i.e., return to the beginning of the cycle. The amount of time within which the user must reissue the paste command in order to paste the next most recently copied data instead of the most recently copied data can be a configurable setting.

Figure 3:
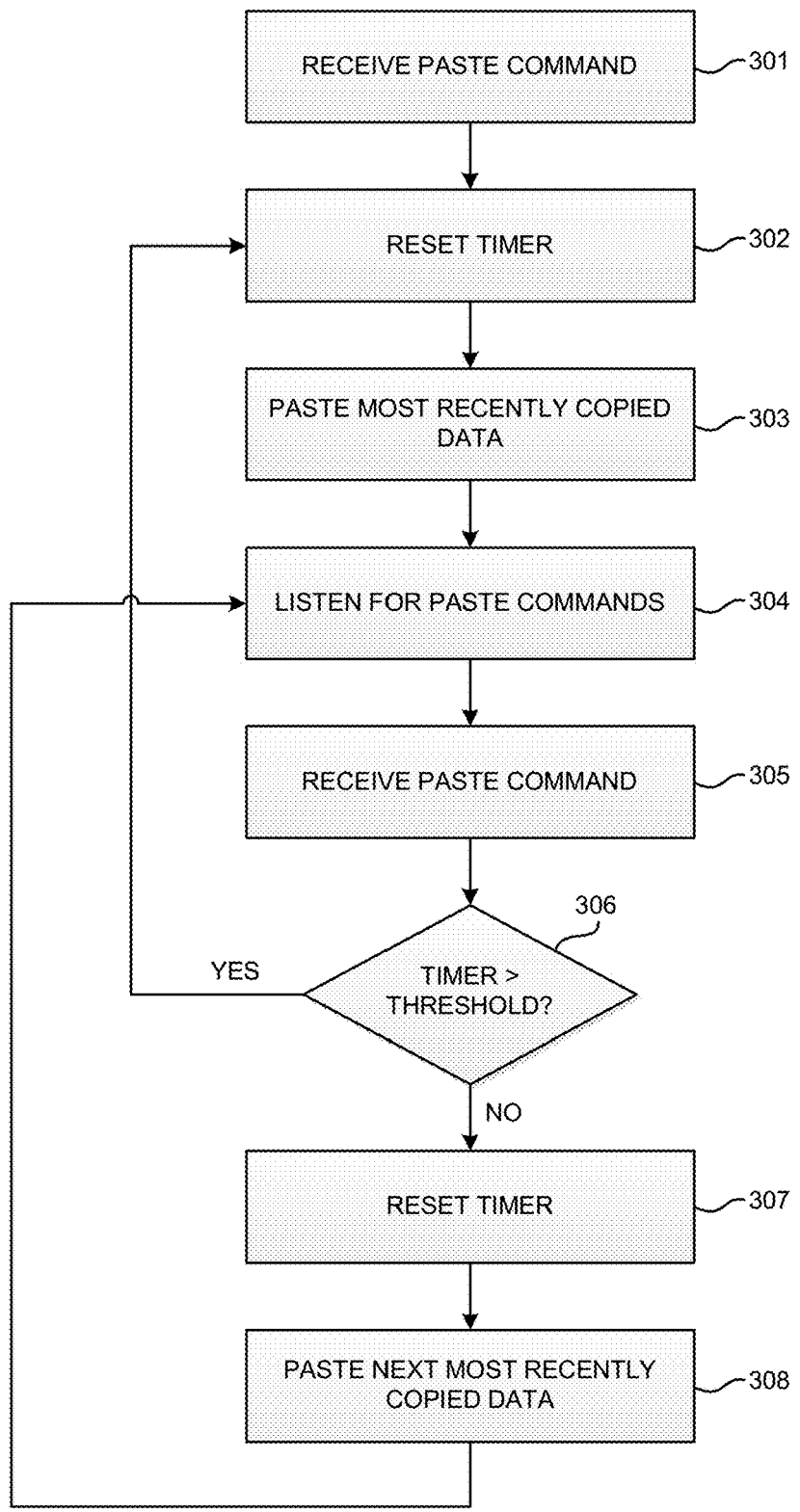
FIG. 3 is a flow diagram illustrating an exemplary method of pasting data in response to a series of paste commands.

FIG. 3 is a flow diagram illustrating an exemplary method of pasting data in response to a series of paste commands. At step 301, device 101 receives an initial paste command from the user. At step 302, device 101 initializes or resets a timer used to measure the time between successive received paste commands. At step 303, device 101 pastes into the appropriate application, interface, or folder the data that was most recently copied at any device participating in the exemplary embodiment of the invention. Device 101 may do so by maintaining a chronological list of the last data to be copied from each participating device, including itself. At step 304, device 101 continues to listen for paste commands from the user. At step 305, device 101 receives another paste command from the user. At step 306, device 101 determines whether the amount of time that has passed since it received the last paste command exceeds the threshold used for determining whether the new paste command should be treated as the next paste command in a sequence of paste commands or the first paste command in a possible new sequence of paste commands. If the amount of time that has passed exceeds the threshold, device 101 returns to step 302, resets the timer, and treats the paste command as the first paste command in a possible new sequence of paste commands by pasting, at step 303, the data most recently copied at any participating device. If the amount of time that has passed is equal to or less than the threshold, device 101 resets the timer at step 307 and, at step 308, pastes the data that was next most recently copied at any participating device. If no such data exists, device 101 returns to the beginning of the chronological list of copied data and pastes the data that was most recently copied at any participating device, including itself. In this manner, device 101 may cycle through the list of copied data. Device 101 then continues to listen for additional paste commands in step 304.

A device may determine which set of data was most recently copied by any participating device by examining metadata associated with each set of copied data. The metadata may include, for example, timestamp information associated with the time the data was copied, timestamp information associated with the time the data as received at a receiving device, or information associated with the data's position in a queue or other data structure. For example, the data most recently copied by any participating device may be placed at the front of a queue, linked list, array, or other data structure, such that the data at the end of the queue or other data structure was copied the longest ago. Such data structure may be configured so that it contains only the most recently copied data for each participating device.

In an alternative embodiment, a paste command may be used to cycle through multiple pieces of copied data from multiple source devices in a configurable order based on the devices from which the data was copied. For example, configuration options may allow a user to specify that when the user issues the paste command on a first device, the device will first paste any data copied from the first device, when the user issues the paste command again within a predetermined amount of time, the device will paste any data copied from a second device, and so on. In this embodiment, devices therefore have different priority. A control module may be used to determine a device's priority with respect to other devices.

Figure 4:
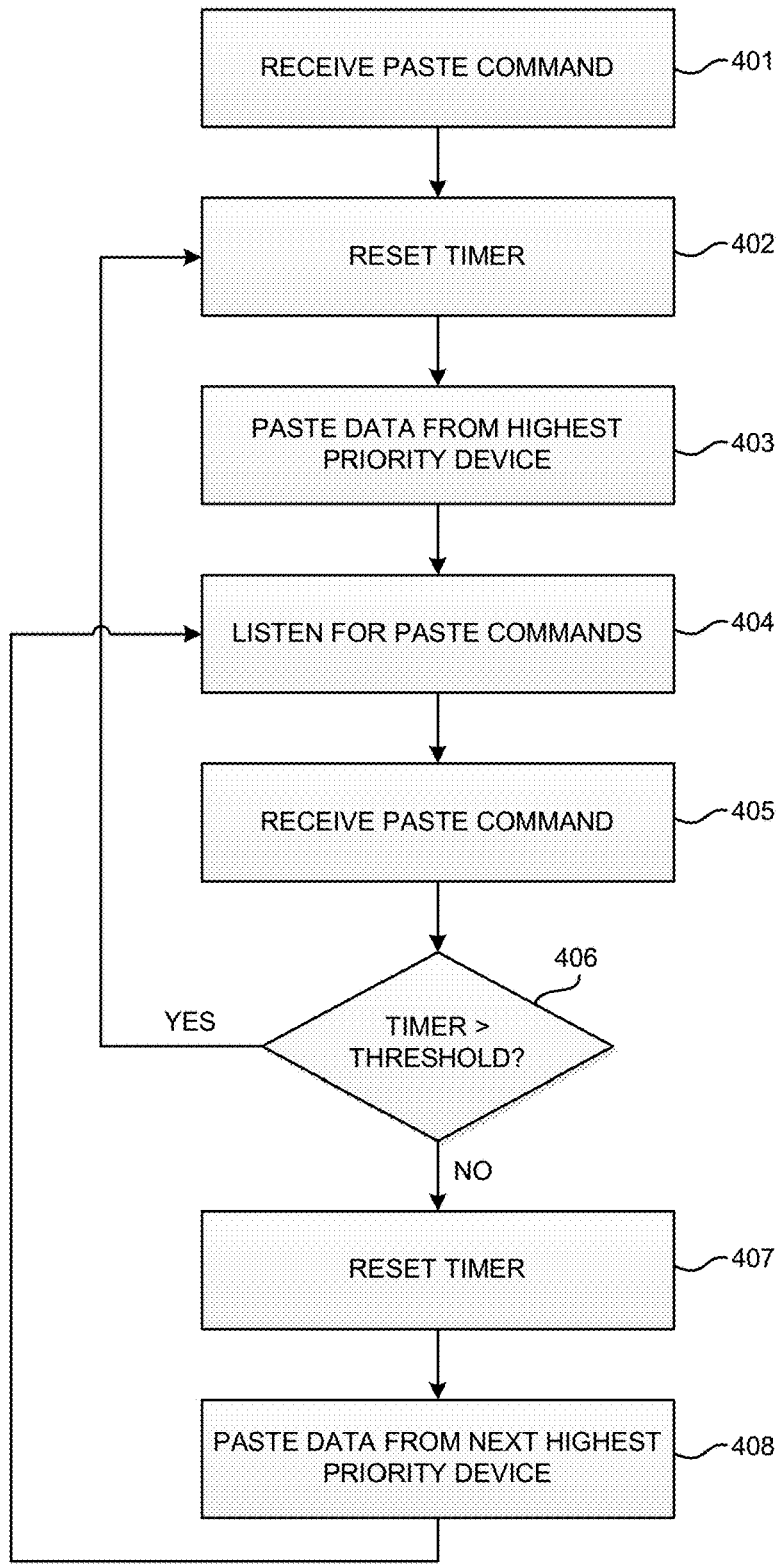
FIG. 4 is a flow diagram illustrating another exemplary method of pasting data in response to a series of paste commands.

FIG. 4 is a flow diagram illustrating another exemplary method of pasting data in response to a series of paste commands. At step 401, device 101 receives an initial paste command from the user. At step 402, device 101 initializes or resets a timer used to measure the time between successive received paste commands. At step 403, device 101 pastes into the appropriate application, interface, or folder the data that was most recently copied from the participating device that the user has configured to have the highest priority. At step 404, device 101 continues to listen for paste commands from the user. At step 405, device 101 receives another paste command from the user. At step 406, device 101 determines whether the amount of time that has passed since it received the last paste command exceeds the threshold used for determining whether the new paste command should be treated as the next paste command in a sequence of paste commands or the first paste command in a possible new sequence of paste commands. If the amount of time that has passed exceeds the threshold, device 101 returns to step 402, resets the timer, and treats the paste command as the first paste command in a possible new sequence of paste commands by pasting, at step 403, the data most recently copied from the highest priority device. If the amount of time that has passed is equal to or less than the threshold, device 101 resets the timer at step 407 and, at step 408, pastes the data that was most recently copied at the device with the next highest priority. If no such data exists, device 101 pastes the data that was most recently copied from the participating device, including itself, with the next highest priority. In this manner, device 101 may cycle through the list of copied data. Device 101 then continues to listen for additional paste commands in step 404.

In an alternative embodiment, different paste commands may be used to select different data that has been copied. For example, the user may copy data, such as an email address, from a first device, by issuing a copy command on the first device. The user may also copy data, such as a phone number, from a second device by issuing a copy command on the second device. The user may then issue on the second device a first paste command, such as a Control-P keystroke. The second device will then paste into the destination document the data copied from the second device, in this case the phone number. The user may then issue on the second device a second, different paste command, such as a Control-Alt-P keystroke. The second device will then paste into the destination document the data copied from the first device, in this case the email address. The different paste commands indicate to the second device which data to paste into the destination document. In this case, the Control-P keystroke indicates to paste the data copied from the same device, and the Control-Alt-P keystroke indicates to paste data from the first device.

Figure 5:
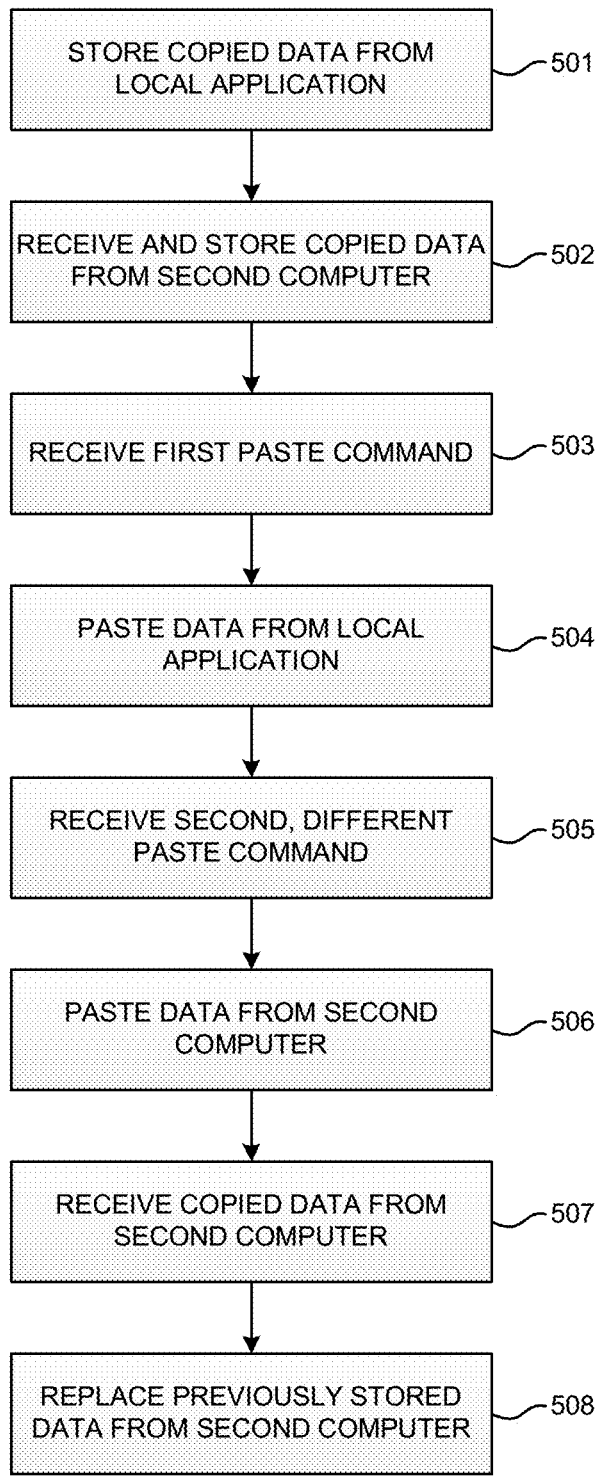
FIG. 5 is a flow diagram illustrating an exemplary method of pasting data in response to a series of different paste commands.

FIG. 5 is a flow diagram illustrating an exemplary method of pasting data in response to a series of different paste commands. At step 501, device 101 stores data that the user copied from a local application. In step 502, device 101 stores data that the user copied at a second device and that device 101 received from the second device. At step 503, device 101 receives a first paste command from the user, such as a Control-P keystroke. At step 504, in response to receiving the first paste command, device 101 pastes the data that the user copied from the local application. At step 505, device 101 receives a second, different paste command, such as a Control-Alt-P keystroke, which the user has configured to correspond to the second device. At step 506, in response to receiving the second, different paste command, device 101 pastes the data it received from the second device. At step 507, perhaps after some time, device 101 receives from the second device data that the user more recently copied at the second device. At step 508, device 101 replaces the previously stored data received from the second device with the more recently received data from the second device. If the user issues the Control-Alt-P keystroke again, device 101 will paste the more recently received and stored data from the second device.

In another embodiment, a paste command may present the user with an menu of selectable options representing the different data that has been copied from different devices. For example, a user may copy a phone number from a first device, an email address from a second device, and a social security number from a third device. The user may then issue a paste command on any of the devices. Upon receiving the paste command, the device will present the user with a menu of the three pieces of data that have been copied from the three devices. The user may select which of three pieces of data to paste into the destination document. The menu may display, for example, the data that was copied from each device or a subpart of the data that was copied from each device. The menu may also display, for example, an identifier of each device from which data was copied. The menu may also display any other available data that may be useful to the user. The paste command operable to display the menu of different data may be the device's or application's standard paste command, such as the Control-P keystroke, or it may be a specialized paste command, such as the Control-Alt-P keystroke, in order to distinguish it from the standard paste command. The menu may not display data that was copied from a given device more than a certain threshold of time ago, such as more than one hour ago. Such threshold of time may be configurable by the user.

Figure 6:
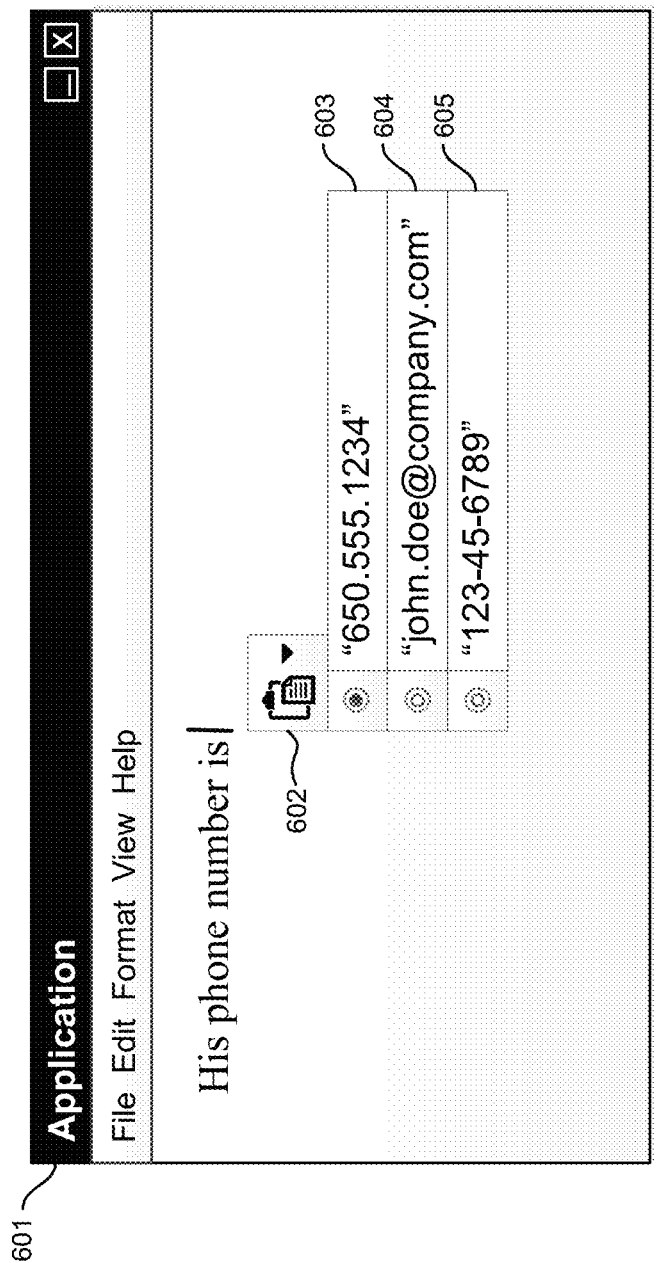
FIG. 6 is a block diagram illustrating an exemplary interface for one embodiment of the invention.

FIG. 6 is a block diagram illustrating an exemplary interface for one embodiment of the invention. Window 601 is an exemplary interface for a typical word processing application, such as Microsoft Word, on a device 101. After the user has issued a paste command, the user is presented with menu 602. Menu 602 presents the user with the most recently copied data from each of the participating devices 101. In this example, data 603 is a phone number, data 604 is an email address, and data 605 is a social security number, each of which was copied from one of three participating devices 101. The user may select one of the displayed pieces of copied data to paste into the document. The user may configure menu 602 to show no more than a specified number of pieces of copied data. The user may also configure whether the copied pieces of data in menu 602 are organized, for example, chronologically or in order of device priority. The user may also configure menu 602 to not show data copied more than a specified amount of time ago, as described above.

A user may issue paste commands on any of the devices described above in accordance with any of the exemplary embodiments described above. For example, a user may issue a paste command on the second device to paste data copied from the first device and may issue a paste command on the first device to paste data copied from the second device.

Any combination of key strokes may be used to issue either a copy command or a paste command. Copy commands and paste commands may be issued from any input device, including a keyboard, a touch screen, a touch pad, a pull-down menu, a command line, a graphical user interface, other user interface components, a voice user interface, or a mouse.

Example Configurable Settings

Various aspects of the invention may be configurable. For example, a user may configure whether reissuing a paste command within a predetermined amount of time since the last paste command results in cycling through different pieces of data copied from different devices or instead pastes an additional copy of the same set of data. Such configuration may take the form of appropriately setting a toggle, checkbox, or similar option in, for example, a graphical user interface.

As described above, the amount of time within which the user must reissue a paste command in order to cycle through different pieces of data copied from different devices may also be a configurable setting. The setting may be configured by, for example, specifying the amount of time as a certain amount of seconds or fractions of a second.

In embodiments where issuing multiple paste commands within a predetermined period of time results in different sets of data being pasted, the user may configure whether the sequence of data that is pasted in response to the multiple paste commands is based on, for example, when each set of data was copied or the device from which each set of data was pasted. For example, the user may specify that the first paste command in the series of paste commands pastes the data that was most recently copied, the next paste command pastes the data that was next mostly recently copied, and so on.

The user may configure the priority of the devices that is used in determining which data to paste when the user issues multiple paste commands within a predetermined period of time. For example, the user may configure a device to first paste data copied from itself (i.e., from the local device), then paste any data copied from a specified second device (e.g., a certain laptop), then paste any data copied from a specified third device (e.g., a certain smart phone), regardless of which set of data was most recently copied.

A user may also configure which devices participate in the invention. For example, a user may wish for data copied from his or her smart phone to not be available for pasting at his or her personal computer, and may configure his or her smart phone to not participate in the invention described herein. A user may also wish to have only the subset of devices into which the user is logged in participate in the invention described herein. An embodiment may include an authentication module on each device that requires that the user authenticate himself or herself before that device distributes copied data to other devices. Such authentication may take the form of providing a username and password. The authentication module may be separate from any other authentication mechanism on the device. For example, it may require authentication specifically for the purpose of enabling that device's participation in the systems and methods described herein. Thus, if there are three devices on a network that are able to participate in the invention, and the user is logged in to all three devices, but authenticates himself to the invention's authentication modules on only two devices, only those two devices will distribute pasted information to other devices. The user may configure whether a given device requires such authentication before distributing pasting information to other devices. In one embodiment, any device on the network, such as a home Wi-Fi network, may distribute copied data to the other devices on the network without requiring any authentication beyond what the device may normally require to be operable by a user.

Devices configured not to participate in the invention described herein may still support traditional copying and pasting, that is, copying and pasting confined to each individual device. Configuration of devices in such a manner may take place from a user interface that has knowledge of all available devices in accordance with the above discussion of device discovery, or it may take place on a user interface of one or more individual devices.

A device that the user has selected to not participate in the invention may avoid participating in the invention simply by not distributing copied data to the participating devices. Similarly, other devices can ensure that they do not paste data copied from devices that the user has selected to not participate in the invention by ignoring any copied data received from such devices.

A user may also configure which applications from a given device participate in the invention. For example, a user may wish for data copied from the browser application on his or her personal computer to not be available for pasting at his or her smart phone, and may configure the invention accordingly. Configuration of devices in this manner may take place in a user interface that has knowledge of applications installed on a particular device, or in a user interface that has knowledge of the applications that have been detected to place data on the device's clipboard. One embodiment may keep a log of applications that have recently placed data on the device's clipboard for purposes of providing such a user interface. For example, in Microsoft Windows, the identity of the current clipboard owner may be determined by calling the "GetClipboardOwner" function of the Windows API, which returns the window handle of the current clipboard owner. The clipboard owner is the window associated with the data on the clipboard. Additional methods of determining such information vary between platforms, but are known to those of skill in the art where available. Such application information may be shared among the devices participating in the invention to allow for configuration at any participating device, or may be limited such that configuration related to a particular device must be performed at that device. For a device that does not readily provide such information, the configurable settings may not provide such application-level preferences for that device.

In the embodiment described above where a paste command displays a menu of copied data available for pasting into a destination document or application, the user may configure what the menu displays. For example, the user may configure the menu to display the different pieces of data available for pasting, or a subset of a piece of data when the data's length exceeds the menu's available display space. The user may also configure the menu to display the name or other identifier of the device from which each set of data was copied. The user may also configure the menu to display the time at which each set of data was copied, or the application or window from which each set of data was copied.

A user may also configure whether copied data expires after a certain amount of time and, if so, what that amount of time is. For example, the user may specify that copied data expires after two hours. If the user specifies such an expiration time, data that was copied from any participating device more than the duration of the expiration time ago will not be pasted when the user issues a paste command. Such a configurable setting allows the user to avoid being presented with pasted data that may no longer be relevant.

Figure 7:
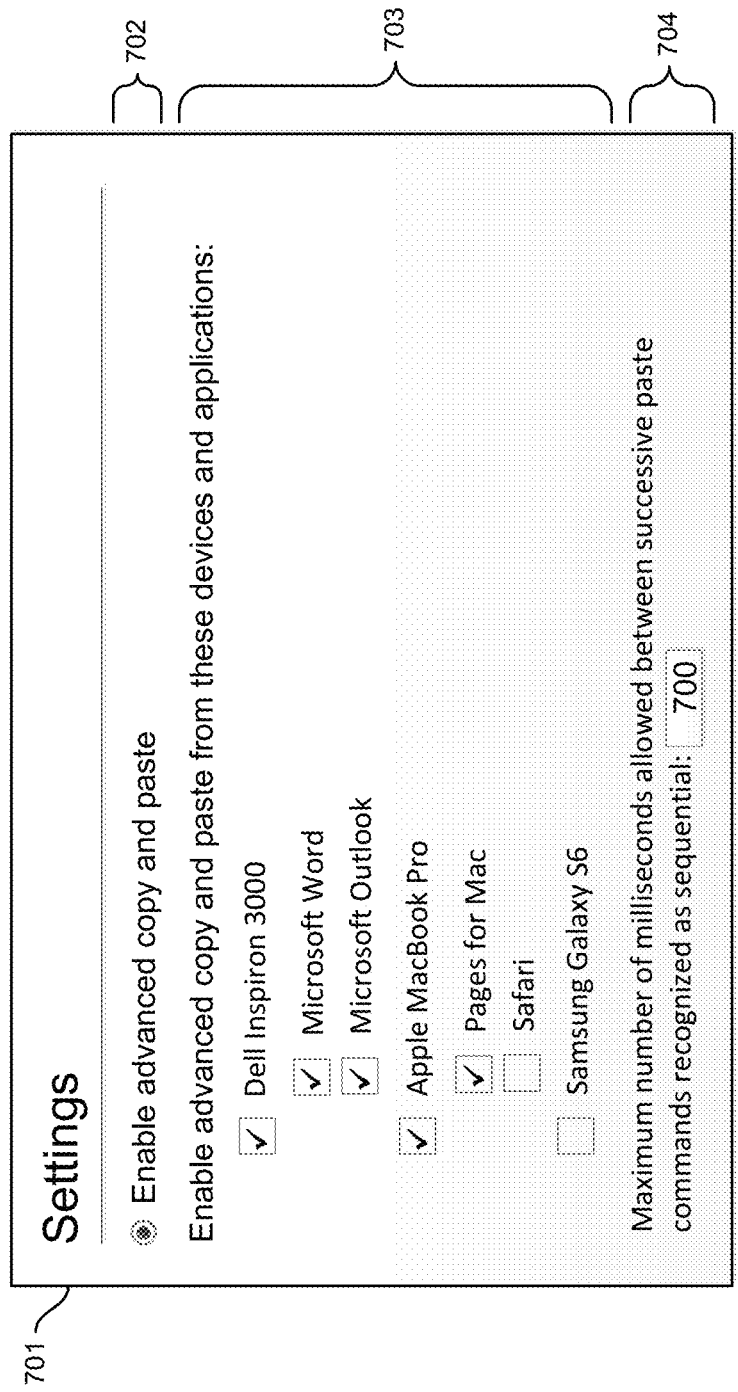
FIG. 7 is a block diagram illustrating an exemplary interface for configuring certain aspects of one embodiment of the invention.

FIG. 7 is a block diagram illustrating an exemplary interface for configuring certain aspects of one embodiment of the invention. Interface 701 on a device 101 includes area 702, area 703, and area 704. Each of devices 101 may have a similar interface. Area 702 allows the user to specify whether the device displaying interface 701 participates in the invention described herein. If the user specifies that the device does not participate in the invention, data copied at the device will not be pasted by any of the other devices when the user issues paste commands at the other devices.

Area 703 lists exemplary discovered devices that are capable of participating in the invention. Area 703 allows the user to specify which devices' copied data will be available at device 101. If a device is not selected to participate in the invention, data copied at that device will not be pasted by device 101 when the user issues paste commands on the device displaying interface 701. In this example, the user has selected that data copied at the Dell Inspiron 3000 and Apple MacBook Pro will be available at device 101, but that data copied at the Samsung Galaxy S6 device will not be available at device 101. Accordingly, when the user issues one or more paste commands on device 101, the paste commands will not result in pasting data that was copied from the Samsung device.

Area 703 also lists, for one or more devices, one or more applications on each of the devices that also are capable of participating in the invention. In area 703, the user can specify which applications on each device participate in the invention. If a device's application is not selected to participate in the invention, data copied at that device and application will not be pasted by device 101 when the user issues paste commands at that device. In area 703, the user has selected that the Apple MacBook Pro computer and its Pages for Mac application should participate in the invention, but its Safari application should not. Accordingly, when the user issues one or more paste commands on device 101, the paste commands will not result in pasting data that was copied from the Safari application on the Apple MacBook Pro.

Area 704 allows the user to specify the maximum number of milliseconds allowed between successive paste commands before they are not recognized as sequential paste commands. In area 704, the user has specified a threshold of 700 milliseconds. If the user issues paste commands on device 101 that are separated by, for example, 1200 milliseconds, the second paste command will not be treated as the second paste command in a sequence of paste commands, but instead will be treated as the first paste command in a possible new sequence of paste commands.

A user may also configure custom keystrokes to paste the data that was mostly recently copied from a specified device or a specified application in a specified device. For example, the user may configure the keystroke Control-Alt-P to correspond to the Pages for Mac application on the Apple MacBook Pro device. When the user issues the Control-Alt-P command on any participating device, the device will paste the data, if any, most recently copied from Pages for Mac on the Apple MacBook Pro device, even if data was more recently copied from other devices. The configurations described herein may be handled by a configuration module.

Example Data Distribution

In one embodiment, a device that has received a copy command may transmit the data selected for copying to all devices on the network that it has detected are capable of operating in accordance with the invention. Such data may be transmit from a source device to a destination device using, for example, any application level protocol supported by both devices, such as HTTP, HTTPs, and so on. The data may be transmitted between the devices using any network protocols supported by both devices, such as TCP/IP. Source devices and destination devices may use predetermined port numbers for the transmission and receipt of such data. Destination devices may execute a listener, daemon, or other process for purposes of detecting and receiving such incoming communications. Destination devices may also use existing listeners, daemons, or other processes for detecting and receiving such incoming communications, such as an HTTP listener.

In an alternative embodiment, a device that has received a copy command may automatically transmit the data selected for copying to a network-connected storage device that is accessible by other devices on the network, such as network-attached storage (NAS) or database. Devices on the network may obtain newly copied data from the network-connected storage device by, for example, periodically polling the device, querying the storage device upon receiving a paste command or upon occurrence of some other event, or both.

Copied data transmitted to one or more devices on the network may be accompanied with metadata indicating the data's origin, such as a device name, application name, window name, or other device or application identifier. Such metadata may be used to ensure that when new data is copied from a device, other devices on the network replace the previously copied data from that device with the newly copied data. Such metadata may also be used to present a menu to the user to allow the user to select which data to paste, as described above.

Copied data distributed to one or more devices on the network may be stored in, for example, a table or other data structure that associates the copied data with its origin information, other identifying information, or other metadata.

A device on the network, upon receiving a paste command, may also query devices on the network capable of operating in accordance with the invention to obtain the latest data that a user has copied from each device.

In another embodiment, a device at which the user has issued a copy command may distribute to other participating devices a record or identifier associated with the data that the user selected for the copy command. Such a record or identifier may be, for example, a unique identifier and may include metadata to indicate, for example, the time at which the user issued the copy command, the device on which the user issued the copy command, the type of data selected, the size of the data selected, or any combination of such metadata. The device may then distribute the data that was the target of the copy command to one or more additional devices at a future time, such as when the user later issues a paste command that requires the data. This embodiment may be used to reduce traffic between the participating devices.

In an alternative embodiment, a device at which the user has issued a copy command may distribute the data that the user selected for the copy command to other participating devices if the size of the data is smaller than a predetermined threshold, which may be a configurable setting. In this way, the embodiment may be used to reduce traffic between the participating devices. A transmission module may be used to transmit data from one device to another, and a reception module may be used to receive data from another device.

Additional Embodiments

In one embodiment, the invention may apply to copying and pasting files rather than data within files. This embodiment may apply to situations where the user is issuing paste commands to an operating system or file system rather than an application. For example, when a user issues a paste command to a device's file system, the file system may paste the file most recently copied from any participating device. As another example, the user may issue a special paste command, such as Control-Alt-P, to a device's operative system or file system to cause the device to paste the file, if any, most recently copied from a second device. The special paste command may be a configurable setting. Any of the other aforementioned embodiments may also be implemented in this manner.

Although the invention has been described with several embodiments, a number of changes, substitutions, variations, and modifications may be suggested to one of skill in the art, and it is intended that the invention encompass all such changes, substitutions, variations, and modifications that fall within the spirit and scope of the claims. In addition, other steps may be provided, or steps may be eliminated, from the described methods, and other components may be added to, or removed from, the described systems.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A method for distributing data between devices on a computer network comprising the steps of:
   receiving, from an input device, a first signal associated with a first user input;
   determining that the first signal indicates a first copy command associated with specified data;
   in response to determining the first copy command, transmitting to a destination device at least an indication of the specified data;
   transmitting the specified data to the destination device;
   receive, from a source device, data associated with a second copy command, determined at the source device;
   receiving, from the input device, a second signal associated with a second user input;
   determining that the second signal indicates a first paste command;
   in response to determining the first paste command, pasting the specified data associated with the first copy command;
   receiving, from the input device, a third signal associated with a third user input;
   determining that the third signal indicates a second paste command;
   determining that the second paste command occurred within a predetermined amount of time of the first paste command; and in response to determining that the second paste command occurred within a predetermined amount of time of the first paste command, pasting the data received from the source device.

2. The method of claim 1, wherein the predetermined amount of time is configurable.

3. The method of claim 1, further comprising: replacing the previously pasted data associated with the first paste command with the data received from the source device.

4. The method of claim 1, further comprising: storing time information associated with the data specified at the source device.

5. The method of claim 4, further comprising: determining that the data from the source device should be pasted based at least in part on the time information.

6. The method of claim 1, further comprising: storing priority data associated with the data received from the source device.

7. The method of claim 6, further comprising: determining that the data received from the source device should be pasted based at least in part on the priority data.

8. A non-transitory computer-readable medium encoded with a computer program for facilitating communication between two or more computers comprising:
   a code segment for receiving, from an input device, a first signal associated with a first user input;
   a code segment for determining that the first signal indicates a first copy command associated with specified data;
   a code segment for, in response to determining the first copy command, transmitting to a destination device at least an indication of the specified data;
   a code segment for transmitting the specified data to the destination device;
   a code segment for receiving, from a source device, data associated with a second copy command, determined at the source device;
   a code segment for receiving, from the input device, a second signal associated with a second user input;
   a code segment for determining that the second signal indicates a first paste command;
   a code segment for, in response to determining the first paste command, pasting the specified data associated with the first copy command;
   a code segment for receiving, from the input device, a third signal associated with a third user input;
   a code segment for determining that the third signal indicates a second paste command;
   a code segment for determining that the second paste command occurred within a predetermined amount of time of the first paste command; and
   a code segment for, in response to determining that the second paste command occurred within a predetermined amount of time of the first paste command, pasting the data received from the source device.

9. The non-transitory computer-readable medium of claim 8, further comprising a code segment for configuring the predetermined amount of time.

10. The non-transitory computer-readable medium of 8, further comprising a code segment for replacing the previously pasted data associated with the first paste command with the data received from the source device.

11. The non-transitory computer-readable medium of claim 8, further comprising a code segment for storing time information associated with the data received from the source device.

12. The non-transitory computer-readable medium of claim 11, further comprising a code segment for determining that the data received from the source device should be pasted based at least in part on the time information.

13. The non-transitory computer-readable medium of claim 8, further comprising a code segment for storing priority data associated with the data received from the source device.

14. The non-transitory computer-readable medium of claim 13, further comprising a code segment for determining that the data received from the source device should be pasted based at least in part on the priority data.

15. A computer on a network, comprising:
   a processor configured to:
      receive, from an input device, a first signal associated with a first user input;
      determine that the first signal indicates a first copy command associated with specified data;
      in response to determining the first copy command, transmit to a destination device at least an indication of the specified data;
      transmit the specified data to the destination device;
      receive, from a source device, data associated with a second copy command, determined at the source device;
      receive, from the input device, a second signal associated with a second user input;
      determine that the second signal indicates a first paste command;
      in response to determining the first paste command, paste the specified data associated with the first copy command;
      receive, from the input device, a third signal associated with a third user input;
      determine that the third signal indicates a second paste command;
      determine that the second paste command occurred within a predetermined amount of time of the first paste command; and
      in response to determining that the second paste command occurred within a predetermined amount of time of the first paste command, pasting the data received from the source device.

16. The system of claim 15, wherein the predetermined amount of time is configurable.

17. The system of claim 15, wherein the processor is further configured to store time information associated with the data received from the source device.

18. The system of claim 17, wherein the processor is further configured to determine that the data received from the source device should be pasted based at least in part on the time information.

19. The system of claim 15, wherein the processor is further configured to store priority data associated with the data received from the source device.

20. The system of claim 19, wherein the processor is further configured to determine that the data received from the source device should be pasted based at least in part on the priority data.

\* \* \* \* \*